June 30, 1925.
P. F. RATCLIFF
WEEDLESS FISHHOOK
Filed Oct. 26, 1923
1,544,034
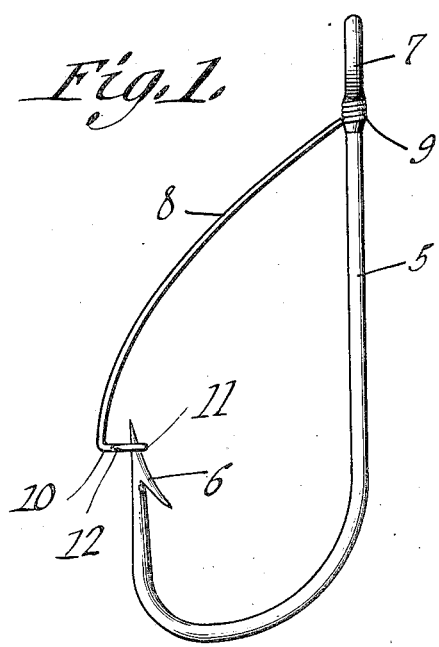
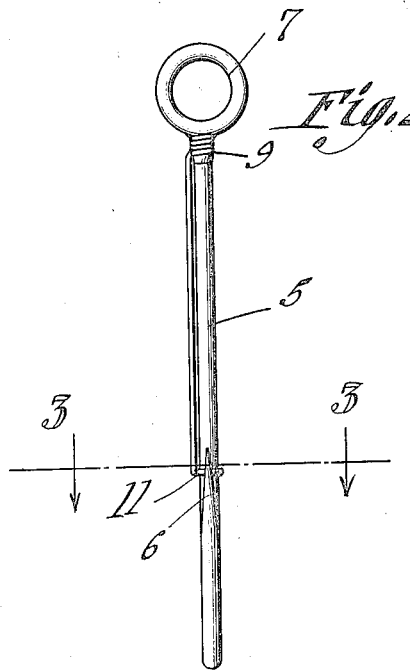
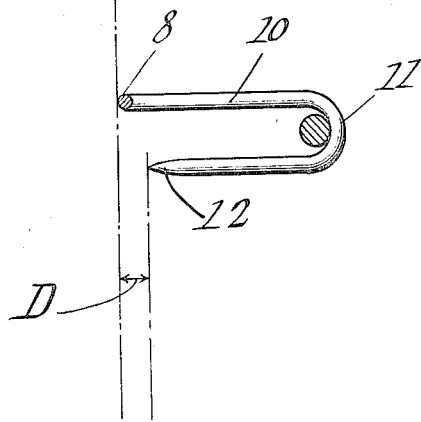
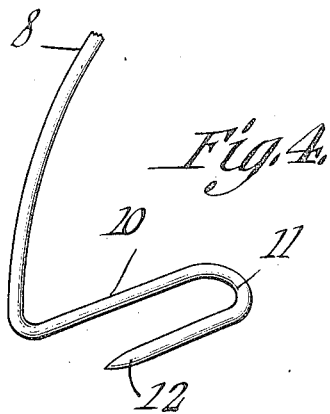
Inventor
P. F. Ratcliff
By
Attorneys Patented June 30, 1925.

1,544,034

UNITED STATES PATENT OFFICE.

PEARY FOSTER RATCLIFF, OF SHREVEPORT, LOUISIANA.

WEEDLESS FISHHOOK.

Application filed October 26, 1923. Serial No. 670,965.

*To all whom it may concern:*

Be it known that I, PEARY FOSTER RATCLIFF, a citizen of the United States, residing at Shreveport, in the parish of Caddo and State of Louisiana, have invented a new and useful Weedless Fishhook, of which the following is a specification.

This invention relates to fish hooks and aims to provide novel means for guarding the piercing extremity of a fish hook against foreign matter such as weeds or the like collecting thereon to render the hook inoperative.

Another important object of the invention is to provide a guard of this character which will move out of engagement with the piercing extremity of a hook when a fish acts to remove the bait therefrom, allowing the hook to pass into the fish.

A still further object of the invention is to provide auxiliary means to assist in securing soft bait to the hook to insure against displacement thereof.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of a hook constructed in accordance with the invention.

Figure 2 is a front elevational view thereof.

Figure 3 is a sectional view taken on line 3—3 of Figure 2.

Figure 4 is a fragmental detail view of the hook engaging guard.

Referring to the drawing in detail, the reference character 5 designates the body portion of the hook which is curved in the usual manner, terminating in a piercing extremity 6 which is also of the usual and well known manner.

Formed at one end of the body portion 5 is the usual ring member 7 through which the fishing line passes when securing the line to the hook member.

The guard forming the essence of the invention is indicated at 8 and includes a length of exceptionally fine wire having one end thereof looped around the body portion 5 at 9, to secure the guard in position, against displacement. As shown, this guard is slightly curved and extends through a point beyond the outer edge of the piercing extremity of the hook member as clearly shown by Figure 1 of the drawing, so that as the hook member is moved through the water, the guard will contact with any foreign matter such as weeds or grass and prevent the weeds or grass from collecting on the piercing end of the hook to render the same inoperative.

In order that lateral movement of the guard 8 will be prevented, the guard is shown as formed with an inwardly extended portion 10 which is curved at 11 to closely engage the piercing extremity of the hook to guard the same, from where the guard extends forwardly terminating in a pointed portion 12, lying in a plane in spaced relation with the outer edge of the guard as illustrated by the lines D shown by Figure 3 of the drawing.

Thus it will be seen that due to this construction, the piercing extremity of the hook is guarded on all sides against foreign matter, but due to the construction of the guard, it will be obvious that the guard will move to disengage the piercing end of a hook member should a fish endeavor to remove the bait therefrom.

It might be further stated that when soft bait is positioned on the hook, the piercing extremity 12 may be forced into the bait to securely hold the same.

I claim:

1. In a fishing hook, a body portion having a piercing extremity, a guard including a length of wire secured to the body portion, one end of the guard extending inwardly and outwardly and terminating at a point in spaced relation with the main portion of the guard to provide a bait securing member.

2. In a fishing hook, a body portion having a piercing extremity, a guard including a body portion formed of a length of wire, one end of the body portion of the guard extending inwardly and outwardly, the extremity being pointed and lying in spaced relation with the body portion of the guard.

In testimony that I claim the foregoing as my own, I have hereto affixed my signature in the presence of two witnesses.

PEARY FOSTER RATCLIFF.

Witnesses:
F. C. O'LEARY,
L. C. MATTHEWS.